United States Patent Office 2,991,289
Patented July 4, 1961

2,991,289
DERIVATIVES OF 1-AMINOPROPANE
Karl Schulte, Darmstadt, Germany, assignor to E. Merck Aktiengesellschaft, Darmstadt, Germany, a corporation of Germany
No Drawing. Filed Feb. 2, 1959, Ser. No. 790,340
Claims priority, application Germany Feb. 5, 1958
7 Claims. (Cl. 260—296)

During investigations seeking to discover a highly efficient analgesic compound, it has been found as a result of very comprehensive research work that derivatives of 1-aminopropane having the general formula:

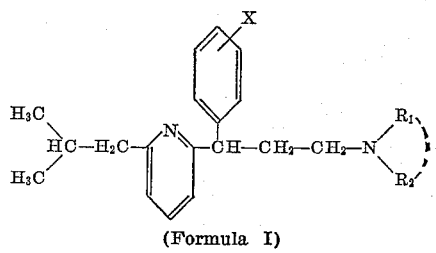

(Formula I)

wherein X designates halogen, alkyl and alkoxy; $R_1$ and $R_2$ designate straight chained or branched alkyl radicals which together have from 1 to 6 carbon atoms, and whereof $R_1$ can also be hydrogen, and wherein the unit

also stands for piperidino, pyrrolidino and morpholino, possess excellent analgesic characteristics. Compounds of the above formula have not been described heretofore in the literature, but some compounds structurally similar thereto are used as antihistamines.

The present invention relates to analgesic-acting derivatives of 1-aminopropane of the general Formula I, and the method of preparing them, and includes the pharmaceutically acceptable salts thereof formed from inorganic and organic acids, as for example, hydrochloric, sulfuric, phosphoric, maleic, tartaric, citric, benzoic, salicylic, i.e., acids normally employed to form salts with therapeutically active amines.

It has been further found that derivatives of 1-aminopropane of the above Formula I, wherein X designates a para-chloro or para-bromo substituent, and $R_1$ and $R_2$ are straight chained or branched alkyl radicals which together have from 1 to 4 carbon atoms and whereof $R_1$ can also be hydrogen, show particularly marked analgesic activity and low order of toxicity.

According to the invention, the compounds of Formula I are obtained when—

(a) Benzylpyridine derivatives of the general formula $RH_2$, wherein R is a bivalent radical of the formula:

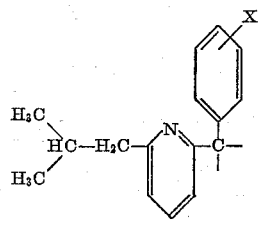

(Formula II)

wherein X has the significance defined in Formula I, are reacted with an aminoethyl halogenide of the general formula

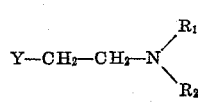

wherein Y is halogen, preferably chlorine or bromine, and $R_1$ and $R_2$ and the unit

have the above stated significance to form compounds of the general Formula I.

The compounds according to the invention can also be synthesized:

(b) From compounds with the basic structure of the general Formula I, which contain non-aromatic C=C— and/or $$-\overset{|}{C}=N-$$

double bonds, by converting such double bond or bonds into saturated bonds by applying conventional methods, or (c) From compounds of the general structure of general Formula I, which contain a radical at carbon 3 of the propyl group that can be replaced by hydrogen, as for instance, a chlorine, bromine or iodine atom, or a N≡C—, HOOC—, $H_2N$—CO— or

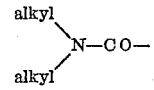

group by replacing such radical with hydrogen by methods known as such.

The preparation of compounds according to the general Formula I also proceeds by—

(d) Catalytic hydrogenation of the compounds of the general formula RH—$CH_2$—CN, where R has the above stated significance, in the presence of a mono- or dialkyl-amine, whereof the alkyl radicals have a total of 1 to 6 carbon atoms, or the dialkyl-amine contains the unit

as defined above.

(e) By condensation of an acetal of the general formula:

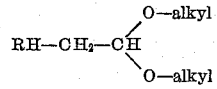

wherein R has the above stated significance with a dialkyl-formamide of the general formula:

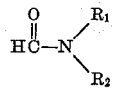

wherein $R_1$ and $R_2$ have the above stated significance; or (f) By condensation of a compound of the general formula:

$$RH—CH_2—CH_2—X'$$

with primary or secondary amines of the general formula:

wherein R, $R_1$, $R_2$ and the unit

have the above stated significance, and X' stands for a halogen.

Finally, the compounds according to the invention can be obtained—

(g) From compounds of the Formula I which contain hydrogen instead of $R_1$ and/or $R_2$, by replacing such hydrogen atoms with substituents $R_1$ and/or $R_2$, by methods known as such, or—

(h) From compounds of the general formula:

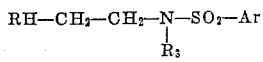

wherein R has the above stated significance, Ar is an aromatic hydrocarbon radical, and $R_3$ is an alkyl radical having 1 to 4 carbon atoms, by replacing the $SO_2$—Ar group with hydrogen by treatment with saponifying agents.

More specifically, it is advantageous to observe the following when the above described methods, (a) to (h), are carried out.

(a) The alkylation reaction is preferably carried out by first metallizing one of the two active hydrogen atoms of the benzylpyridine compound by methods known as such. Such a metallization can be obtained, for example, by treatment of the benzylpyridine compound with sodium amide in liquid ammonia and in the presence of a suitable hydrocarbon, such as, toluene or xylene. One can also introduce an alkali metal atom by reaction with alkali metal organic compounds, as for example, lithium methyl or sodium phenyl.

(b) The hydrogenation of the C=C— double bond is preferably carried out catalytically in the presence of a precious metal catalyst, as for example, palladium. The Schiff bases are suitably hydrogenated by nickel catalysts. It is advantageous to operate at a slightly elevated pressure.

(c) The substitution of the aliphatically bound halogen atom (chlorine, bromine or iodine) can be effected by hydrogenation in the presence of a precious metal catalyst. To effect saponification and/or decarboxylation of the N≡C—, HOOC—, $H_2N$—CO— or

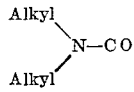

group, the compound may be boiled with 70 percent sulfuric acid or with butanolic alkali metal hydroxide, e.g., potassium or sodium hydroxide. The saponification or decarboxylation can also be effected by treatment with sodium amide in xylene or by reaction with a metallic organic compound (Grignard compound or alkali metal alkyl) in an inert saponification medium, such as anisole, toluene or xylene, at a temperature of about 70° C.

(d) The catalytic hydrogenation of the nitrile of the formula RH—$CH_2$—CN (R has the same significance as stated above) is preferably carried out in the presence of a nickel or cobalt catalyst.

(e) The reaction of the acetal with a dialkyl formamide occurs particularly favorably in the presence of hydrogen chloride and formic acid.

(g) The alkylation at the nitrogen can be effected under the usual conditions. The reaction with formaldehyde in the presence of formic acid is particularly suitable for the introduction of methyl groups. Depending upon the reaction conditions employed, either the mono- or the dimethylamino compound is obtained.

The compounds according to the invention are highly efficient analgesic compounds. The efficiency seems to be limited to the small group of compounds according to the invention, since even slight changes in the molecular structure, for instance, the introduction of other alkyl groups into the pyridine ring, or the substitution at the nitrogen by other than the stated alkyl radicals, result in the marked decrease of the efficiency.

The analgesic action is particularly marked for 1-(6'-isobutylpyridyl-2')-1-(p-bromophenyl)-3-diethylamino-propane and 1-(6'-isobutyl-pyridyl-2')-1-(p-bromophenyl)-3-dimethylamino-propane. These two compounds have a pronouncedly stronger analgesic action than 4-dimethylamino-1,5-dimethyl-2-phenyl-3-pyrazolone (A) or 1,2-diphenyl-3,5-dioxo-4-n-butylpyrazolidine (B). Comparative tests with commercial combination preparations made from (A) and (B) have also shown that the compounds according to the invention produce a markedly stronger analgesic action; especially, the duration of the analgesic action is longer with the compounds according to the invention. For instance, 5 mg. of 1-(6'-isobutylpyridyl-2')-1-(p - bromophenyl) - 3 - dimethylamino-propane per kg. body weight per os is required in order to obtain the Dosis analgetica 50 after 1 hour. In order to obtain the same analgesic activity, 20 mg. of 1,2-diphenyl-3,5-dioxo-4-n-butyl-pyrazolidine is required.

In order to obtain analgesic action (Dos. analg. 50) for 20 minutes, only 3.4 mg. of 1-(6'-isobutylpyridyl-2')-1-(p-bromophenyl)-3-diethylamino-propane per kilo of body weight, orally administered, is required, whereas 400 mg. of a combination preparation consisting of 1,2-diphenyl-3,5-dioxo-4-n-butylpyrazolidine-sodium (50%) and 1,5-dimethyl-4-dimethylamine-2-phenyl-3-pyrazolone (50%) is required.

Hence, the compounds according to the invention in comparison with the heretofore known analgesic compounds, show a very striking superiority in their analgesic action. The tolerance of the new substances is good and thus the use thereof as a chemotherapeutic agent appears to be justified.

The following are examples in accordance with this invention. The term "Torr" as used therein is the international unit of pressure, to wit, a pressure of 1 mm. of mercury, 1/760 atmosphere.

*Example 1*

4.20 g. (grams) of α-(β-diethylaminoethyl)-α-(6-isobutylpyridyl-2)-p-bromobenzyl-cyanide in 210 g. of 70 percent sulfuric acid was boiled under reflux for 6 hours. The solution was poured on ice, filtered over charcoal, alkalinized with caustic soda solution (20% concentration), and extracted with diethyl ether. After drying and concentration by evaporation of the ethereal solution, a residue of 36.5 g. was obtained. Upon distillation, thereof at a pressure of 0.01 Torr, at a temperature of 158–162° C., there was obtained 31.4 g. of the distillate which was 1-(p-bromophenyl)-1-(6'-isobutylpyridyl-2') - 3 - diethylamino-propane.

*Example 2*

To a boiling mixture of 8.4 g. of potassium hydroxide in 100 ccm. of n-butanol, there was added 20 g. of α-(6-isobutylpyridyl-2)-α-(β-dimethylaminoethyl) - p - bromobenzylcyanide admixed with a small amount of n-butanol. The mass was boiled for 4 hours under reflux. The butanol was removed by vacuum distillation; and the residue taken up in diethyl ether and water. The ethereal solution was shaken up as frequently as necessary with water until it ceased to show alkalinity to phenophthalein. After drying and concentration by evaporation of the ethereal solution, a residue of 18.8 g. was obtained. From this residue there was separated by distillation the 1-(6'-isobutylpyridyl-2')-1-(p - bromophenyl) - 3 - dimethylamino-propane having a boiling point of 137–140° C. at 0.01 Torr.

*Example 3*

To a mixture of 3.0 g. of magnesium shavings and 100 ccm. of anisole there was added, at 40° C., 13.6 g. of ethylbromide. The mass stirred until all of the magnesium went into solution. There was added to the solution at a temperature of 50–60° C. a mixture of 40 g. of α-(6-isobutylpyridyl-2)-α-(β-dimethylaminoethyl)-p-bromobenzylcyanide and 50 g. of anisole. The mass was stirred at 70° C. for an additional 2 hours. After decomposition with ice, the mixture was acidified with hydrochloric acid, shaken up and separated. The anisole was exhausted by shaking up with hydrochloric acid. The acid solution was reacted with ammonia; the precipitated base then taken up in diethyl ether and benzene; and the solvent dried and concentrated by evaporation. Upon distillation of the residue, there was obtained the 1 - (6'-isobutylpyridyl-2')-1-(p-bromophenyl)-3-dimethylamino-propane, having a boiling point of 137–140° C. at 0.01 Torr.

Example 4

A mixture of 100 ccm. of liquid ammonia, a small quantity of ferric nitrate and 2.3 g. of sodium was stirred for 2 hours. 100 ccm. of xylene was added thereto and the ammonia evaporated off. After the addition of 20 g. of α-(6-isobutylpyridyl-2)-α-(β'-dimethylaminoethyl)-p-bromobenzylcyanide, the mass was boiled under reflux for 24 hours. The mass was decomposed with ice, diluted with diethyl ether and shaken up with water. Upon distillation of the solvent residue, there was obtained the 1-(6'-isobutylpyridyl-2')-1-(p-bromophenyl)-3-dimethylamino-propane, having a boiling point of 137–140° C. at 0.01 Torr.

Example 5

4.9 g. of crude α-(6-isobutylpyridyl-2)-α-(β-dimethylaminoethyl) - p - bromophenylacetic acid - dimethylamide [obtained by the condensation of α-(6-isobutylpyridyl-2)-p-bromophenylacetic acid-dimethylamide and β-(dimethylamino)-ethylchloride] was boiled for 5 hours under reflux together with 25 g. of 75 percent sulfuric acid. The solution was poured on ice, extracted with diethyl ether, reacted with an excess of caustic soda solution and again extracted with ether. On distillation the ethereal solution yielded the 1-(6'-isobutylpyridyl-2')-1-(p-bromophenyl)-3-dimethylaminopropane, having a boiling point of 137–140° C. at 0.01 Torr.

Example 6

To 150 ccm. of liquid ammonia, there was added with stirring during the course of 20 minutes, 6.5 g. of β-methylaminoethylchloride-hydrochloride. Then 50 ccm. of toluene was added thereto and the mixture stirred until the ammonia evaporated off. The precipitated salt was removed by suction filtration and washed with toluene. The filtrate was employed in accordance with the following reaction: 200 ccm. of liquid ammonia and a small amount of ferric nitrate were reacted with 1.3 g. of sodium. After stirring for 2 hours, the above described solution of the β-methylaminoethylchloride in toluene was added to a solution of 15.2 g. of 6-isobutyl-2-p-bromobenzylpyridine in a small quantity of toluene; and after 2 hours 100 ccm. of toluene was added thereto. The mass was stirred overnight at room temperature. The mixture was decomposed with water and separated. The residue in the toluene, 16.4 g., yielded on distillation the 1-(p-bromophenyl)-1-(6'-isobutylpyridyl-2')-3-methylamino-propane, having a boiling point of 160–161° C. at 0.05 Torr. The dipicrate thereof has a melting point of 140–142° C. The 1-(p-bromophenyl)-1-(6'-isobutylpyridyl-2')-3-ethylaminopropane, obtained by the same method, has a boiling point of 167–170° C. at 0.05 Torr. The dipicrate thereof has a melting point of 167–170° C.

Example 7

8.6 g. of β-diethylaminoethylchloride-hydrochloride are introduced while stirring into 200 ccm. of liquid ammonia. 50 ccm. of toluene are added thereto and the stirring continued until the ammonia is evaporated off. The filtrate obtained from the suction filtration of the precipitated salt was employed according to the following treatment: To 200 ccm. of liquid ammonia there was added while stirring 0.1 g. of iron (III)-nitrate and 3.0 g. of sodium. After 2 hours, 15.2 g. of 2-(p-bromobenzyl)-6-isobutyl-pyridine with a small amount of toluene was mixed therewith; after 30 minutes the above described solution of diethylaminoethylchloride was added, and after 2 hours 100 ccm. of toluene was added thereto. The reaction mixture was stirred overnight at room temperature. After the addition of water, the mixture was separated. The toluene solution was shaken up with an excess of hydrochloric acid; and after the addition of caustic soda solution, shaken up with diethyl ether. Upon distillation at 0.01 Torr, the residue of the ethereal portion yielded at 158–162° C. the 1-(6'-isobutylpyridyl-2') - 1 - (p - bromophenyl)-3-diethylamino-propane. The picrate thereof, crystallized from ethyl acetate, has a melting point of 149–151° C.

Example 8

142 g. of crude α-(β'-dimethylaminoethyl)-α-(6-isobutylpyridyl-2)-p-chlorobenzyl-cyanide [obtained by the condensation of α - (β' - dimethylaminoethyl) - p-chlorobenzyl-cyanide with 6-isobutyl-2-chloropyridine] was boiled in 700 g. of 75 percent sulfuric acid for 6 hours while stirring. Upon cooling, the mass was poured on ice, extracted with diethyl ether, alkalinized with sodium hydroxide and extracted with diethyl ether. The residue, 102 g., obtained from the dried ethereal solution, was distilled at 0.01 Torr at 148–150° C. There was obtained 68.5 g. of 1-(p-chlorophenyl)-1-(6'-isobutylpyridyl-2')-3-dimethylamino-propane.

Example 9

A mixture of 6.2 g. of 1-(6'-isobutyl-pyridyl-2')-1-(p-bromophenyl)-3-amino-propane [obtained by the condensation of 2-(p-bromobenzyl)-6-isobutyl-pyridine with β-aminoethyl-chloride], 50 ccm. cyclohexane and 1 g. acetone was allowed to stand for 24 hours at room temperature, was dried with potassium carbonate and hydrogenated with previously reduced platinum oxide in cyclohexane. After 400 ccm. of hydrogen had been taken up, the reaction was interrupted. The reaction mass was filtered to remove the catalyst and the solvent evaporated off. From 6.6 g. of the residue there was obtained on distillation at 0.01 Torr at 165–167° C. 4.7 g. of 1-(p-bromophenyl)-1-6'-isobutylpyridyl - 2')-3-isopropyl-amino-propane. The picrate thereof has a melting point of 84–89° C.

Example 10

16 g. of crude 1-(p-bromophenyl)-1-(6'-isobutyl-pyridyl-2')-β-n-butylamino-propane-p-toluene sulfonamide [obtained by the condensation of 2-(p-bromobenzyl)-6-isobutyl-pyridine with N-(n-butyl)-N-(β-chloroethyl)-p-toluene-sulfonamide] in 100 g. of 70 percent sulfuric acid was boiled under reflux for 6 hours. The reaction mixture was poured on ice and extracted with diethyl ether, alkalinized with caustic soda and extracted with diethyl ether. The residue obtained from the ethereal extract, amounting to 10.5 g., yielded on distillation at 0.01 Torr at 175–176° C., 7.0 g. of 1-(p-bromophenyl)-1-(6'-isobutylpyridyl-2')-3-n-butylamino-propane.

Example 11

4.2 g. of α-(p-bromophenyl)-α-(6-isobutylpyridyl-2)-propionacetal [obtained by the condensation of 2-(p-bromobenzyl) - 6 - isobutyl - pyridine and bromoacetal, BrCH₂CH(OC₂H₅)₂], 5.6 ccm. of dimethylformamide, 0.33 ccm. of hydrochloric acid (specific gravity 1.19), and 0.85 ccm. of 85 percent formic acid were mixed and heated in a bath having a temperature of 180° C., using a descending cooler, until the inner temperature reached 155° C. without any further distillation taking place. Then the mass was heated under reflux for 20 hours at a bath temperature of 180° C. The dimethylformamide was distilled off in a vacuum, the residue taken up in diethyl ether and the ethereal solution shaken up with 2 N hydrochloric acid. The hydrochloric acid was alkalinized with caustic soda, the precipitated base taken up in diethyl ether and the ethereal solution dried. There was obtained from the ethereal solution a residue of 2.3 g. of 1-(p-bromophenyl)-1-(6'-isobutyl-pyridyl-2')-3-dimethylaminopropane.

Example 12

2.5 g. of 1-(p-bromophenyl)-1-(6'-isobutylpyridyl-2')-3-isopropyl-amino-propane, 0.83 g. of 90 percent formic acid and 0.60 g. of 35 percent formaldehyde were mixed while cooling; the mixture heated on a steam bath until the principal evolution of $CO_2$ ceased and then for 12 hours at a bath temperature of 100° C. Upon the addition of 10 cc. of 2 N hydrochloric acid, the formaldehyde was distilled off under vacuum and the residue, obtained upon the addition of caustic soda, was extracted with diethyl ether. The residue of the ethereal solution, 2.3 g., yields with picric acid, the picrate of 1 - (p - bromophenyl) - 1 - (6' - isobutylpyridyl - 2') - 3-methyl-isopropylaminopropane, having a melting point of 150–156° C.

*Example 13*

A mixture of 15.0 g. of α-(p-chlorophenyl)-α-(6-isobutylpyridyl-2)-propionitrile, 4.0 g. of dimethylamine, 35 g. of cyclohexane and 8.0 g. of Raney-nickel is hydrogenated under a hydrogen pressure of 160 atmospheres at room temperature. Upon completion of the hydrogenation, the mass is shaken up with water and the catalyst removed by filtration. The filtrate is dried and concentrated by evaporation. The obtained residue is distilled at 0.01 Torr at 146–149° C., yielding 11 g. of 1 - (p - chlorophenyl) - 1 - (6' - isobutylpyridyl - 2')-3-dimethylaminopropane. The picrate thereof has a melting point of 185–187° C.

*Example 14*

3.7 g. of omega-p-chlorophenyl-omega-(6-isobutylpyridyl-2)-propionic acid-diethylamide [obtained by the condensation of 2-p-chlorobenzyl-6-isobutylpyridine with chloroacetic acid-diethylamide] in 250 ccm. of dry diethyl ether was reacted with 0.76 g. of lithium aluminum hydride and boiled for 8 hours while stirring. Then the excess lithium aluminum hydride was decomposed with moist diethyl ether; the ethereal solution shaken up with water, dried, filtered, and concentrated by evaporation. Distillation of the residue at 0.01 Torr, at 155–158° C., yielded the 1-p-chlorophenyl-1-(6'-isobutylpyridyl-2')-3-diethylamino-propane. The picrate thereof melts at 157–160° C.

It will be understood that the foregoing description of the invention and the examples set forth are merely illustrative of the principles thereof. Accordingly, the appended claims are to be construed as defining the invention within the full spirit and scope thereof.

I claim:

1. A member of the group consisting of 1-(6'-isobutylpyridyl - 2') - 1 - (p - bromophenyl) - 3 - mono - lower alkyl aminopropane, 1 - (6' - isobutylpyridyl - 2') - 1-(p-chlorophenyl)-3-mono-lower alkyl amino propane, 1 - (6' - isobutylpyridyl - 2') - 1 - (p - bromophenyl)-3-di-lower alkyl amino propane, and 1-(6'-isobutylpyridyl-2')-1-(p-chlorophenyl)-3-di-lower alkyl amino propane, the carbon content of the lower alkyl radicals in the 3-amino group totalling from 1 to 4 carbon atoms.

2. 1 - (6' - isobutylpyridyl - 2') - 1 - (p - bromophenyl)-3-mono-methyl amino propane.

3. 1 - (6' - isobutylpyridyl - 2') - 1 - (p - chlorophenyl)-3-mono-methyl amino propane.

4. 1 - (6' - isobutylpyridyl - 2') - 1 - (p - chlorophenyl)-3-di-ethyl amino propane.

5. 1 - (6' - isobutylpyridyl - 2') - 1 - (p - chlorophenyl)-3-di-ethylamino propane.

6. 1 - (6' - isobutylpyridyl - 2') - 1 - (p - bromophenyl)-3-diethylamino propane.

7. 1 - (6' - isobutylpyridyl - 2') - 1 - (p - bromophenyl)-3-dimethylamino propane.

References Cited in the file of this patent

UNITED STATES PATENTS

| | | |
|---|---|---|
| 2,567,245 | Sperber et al. | Sept. 11, 1951 |
| 2,585,239 | Granatek | Feb. 12, 1952 |
| 2,656,358 | Sperber et al. | Oct. 20, 1953 |
| 2,774,768 | Ehrhart et al. | Dec. 18, 1956 |